March 24, 1925.
H. C. THOMSEN
BAKER'S KNIFE
Filed July 11, 1924
1,530,796
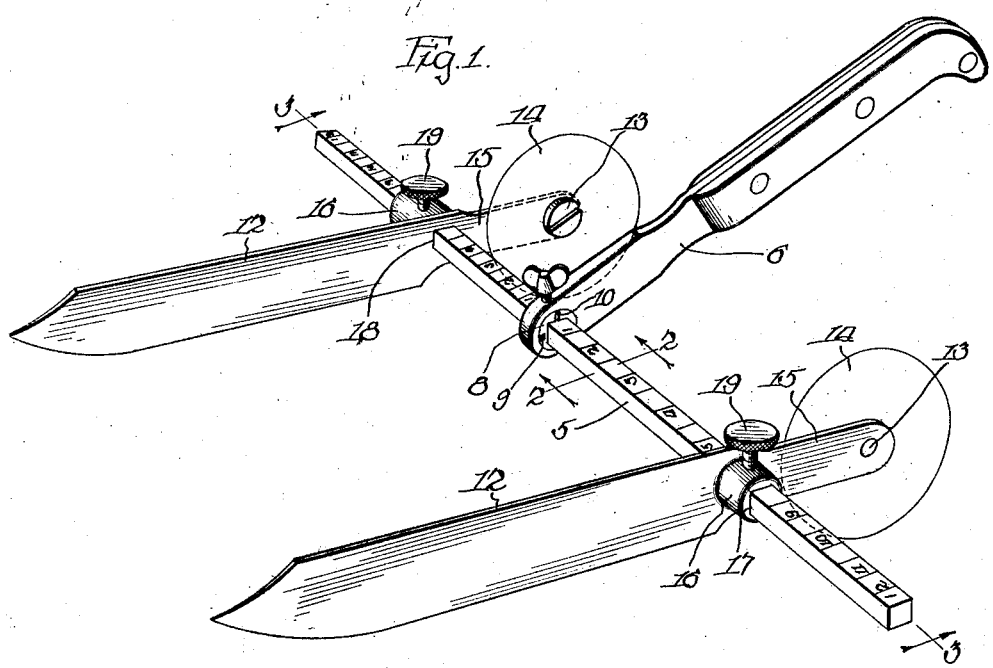
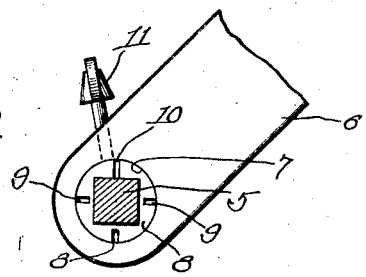
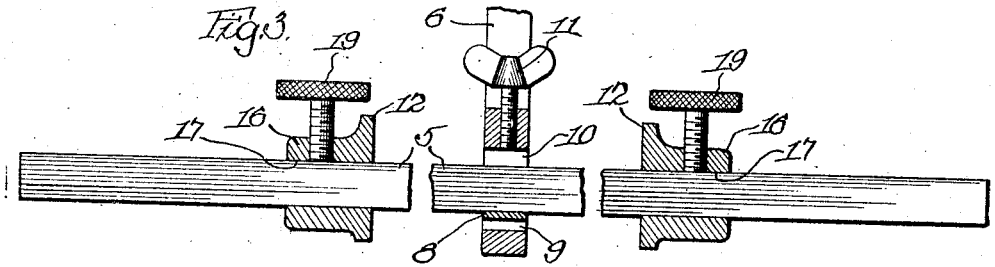
Inventor:
Hans C. Thomsen:
By Chas. C. Tillman
Atty.

Patented Mar. 24, 1925.

1,530,796

UNITED STATES PATENT OFFICE.

HANS C. THOMSEN, OF CHICAGO, ILLINOIS.

BAKER'S KNIFE.

Application filed July 11, 1924. Serial No. 725,387.

*To all whom it may concern:*

Be it known that I, HANS C. THOMSEN, a citizen of the United States, residing at Chicago, in the county of Cook and State of Illinois, have invented certain new and useful Improvements in Bakers' Knives, of which the following is a specification.

This invention relates, generally, to improvements in cutters or knives, but has particular relation to a cutting device or knife especially intended for use by bakers, or in bakeries, for the purpose of cutting dough, pastries, cakes, bread and the like into various shapes and sizes, and it consists in certain peculiarities of the construction, novel arrangement and combination of the various parts thereof, which will be more readily understood and clearly seen when read in conjunction with the accompanying drawing.

An object of the invention is, to provide a cutter or knife of the above mentioned general character, which shall be simple and inexpensive in construction, strong, durable and efficient in operation, with its parts so made, arranged and cooperating with one another, that it can be used for cutting sheets of dough or other pliable or plastic material into pieces of various sizes, shapes and dimensions, or for cutting pastries of various kinds as well as jelly rolls or marshmallow rolls and balls, fruit and other kinds of slices, and the like, into portions of different sizes and shapes, without making any structural changes in the cutter.

Another object of the invention is the provision of means whereby certain parts of the device may be readily adjusted with respect to one another, to the end that the dimensions of the pieces of material to be cut may be predetermined and of uniform size, as well as, to enable the device to be more readily manipulated for cutting dough or pastries and the like.

Other objects and advantages of the invention will be disclosed in the following description and explanation, which explanation will be more readily understood when read in conjunction with the accompanying drawing, in which an embodiment of which the invention is susceptible is illustrated, it being understood that changes and modifications may be resorted to without a departure from the spirit of the invention, so long as they fall within the scope of the appended claims forming a part hereof.

In the drawing,—

Fig. 1 is a perspective view of the knife or cutter showing its parts in about the positions they will occupy when ready for use.

Fig. 2 is an enlarged cross-sectional view partly in elevation taken on line 2—2 of Fig. 1 looking in the direction indicated by the arrows, and Fig. 3 is a longitudinal sectional view taken on line 3—3 of Fig. 1 as indicated by the arrows, but shortened for convenience of illustration.

Corresponding numerals of reference refer to like parts throughout the different views of the drawing.

The reference numeral 5 designates the supporting shaft for the blades and handle of the device, which shaft is by preference rectangular in cross-section and is provided on its upper surface with a graduated scale, the indicating numerals of which increase from a zero mark at the middle of the shaft 5 towards each end of said shaft. These graduating marks are usually disposed at one-fourth of an inch apart, but may be arranged at a greater or lesser distance apart according to the degree of accuracy desired in the adjustment of the blades of the device, as is obvious.

Detachably mounted on the shaft 5 is one end of the handle 6 of the tool or implement which is provided within a circular opening 7 located near the lower end of the handle 6 with a sleeve or collar 8 which has a rectangular opening for the reception of the shaft 5 which shaft may be slid through the opening in the collar 8 until the latter is positioned midway between the ends of the shaft. The collar 8 as shown in Figs. 1 and 2 of the drawings is provided with a plurality of radially disposed slots 9 which are open at the periphery of the collar 8 but terminate short of the opening in the collar for the reception of the shaft and said slots are for the purpose of affording some resiliency to the collar which is split at its upper portion by a radial slot 10 which extends from the periphery of the collar 8 through the same to the opening in the collar for said shaft.

The above construction of the collar is clearly shown in Fig. 2, in which view it will be observed that the upper portion of the handle 6 is provided near its end adjacent the shaft 5 with a set screw 11 mounted on the handle so that its lower end will contact with the periphery of the collar 8 at one side of the slot 10 therein, which arrangement will cause the collar 8, when the screw 11 is tightened thereon, to clamp the shaft 5 and thus prevent the handle turning thereon.

When it is desired to change the position of the handle longitudinally with respect to the shaft 5, it is manifest that by loosening the screw 11 so as to remove its inner end from binding contact with the collar, the latter, on account of its resiliency due to the slots 9 and 10, will expand so that the collar with the handle mounted thereon can be slid in either direction on the shaft.

Mounted on the shaft 5 on each side of the handle 6 is a knife blade 12 which are of the same construction as will be understood by reference to Fig. 1 of the drawing, in which view it will be seen that each of the blades 12 has rotatably mounted on its rear portion by means of a screw 13 engaging a suitable opening in the shank or stem of the blade 12 a circular cutter 14 each of which is mounted on the screw 13 between the head of the latter and the shank 15 of the blade so as to turn independently of its screw or journal. Each knife blade 12 has on its outer surface a boss 16 provided with a rectangular opening 17 extended there-through for the reception of the shaft 5 and communicating with a similarly shaped opening 18 in each of the blades 12 through which openings the shaft is also extended. Each of the bosses 16 has seated in its upper portion a set screw 19 adapted to engage with its inner end the upper surface of the shaft 5 when it is desired to fix the blades 12 on said shaft after they have been suitably adjusted thereon.

By the foregoing arrangement and construction of the parts, it is apparent that the handle 6 can be slid on the bar or shaft 5 to about the middle thereof and fixedly held in said position by tightening up the set screw 11 which not only serves to cause the collar 8 to clamp the shaft 5 against longitudinal movement on said shaft, but also acts to permit of the angular adjustment of the handle 6 with respect to said shaft.

From the foregoing, and by reference to the drawing, it will be readily understood and clearly seen that by my improvements I have provided a cutter or knife, the cutting members of which can be adjusted in parallel planes with one another so as to enable the material to be cut into pieces of desired sizes and uniformity. By my improvements it will also be understood that by providing the cutting blades 12 with the rotary cutters 14, a device especially adapted for cutting dough or pliable material is provided, for by pressing downwardly on the handle 6, it is obvious the blades 12 will be elevated so that the rotary cutters 14 only may act to cut or divide the dough or the like into strips or slices of uniform width. If it is desired, the blades may be used by placing them cross-wise of the strip or slice formed by the rotary cutters and moved back or forth to cut slices into squares. Furthermore, it is obvious that if diamond-shaped pieces are desired, the blades 14 can be positioned diagonally to the slice or strip and moved in the proper direction for severing the same.

Assuming that the handle 6 is fixed on the shaft 5 by means of the set screw 11 and clamping collar 8 at about the angle shown in Fig. 1 of the drawings, it is manifest that by pressing downwardly on the free end of the handle and utilizing the rotary cutters 14 as a fulcrum, the blades 12 can be elevated at their front ends to a considerable degree so that a jelly or marshmallow roll of considerable diameter can be placed under the cutting edges of the blades, when by proper manipulation of the device, slices of the desired size can be cut from said rolls.

The operation of the device for cutting slices or pieces of pastries, apple or coffee cake, fruit slices, and the like, is so obvious as to be deemed unnecessary to herein describe.

By providing each of the blades 12 with the laterally disposed boss on one side thereof at about the juncture of the shank 15 with the blade, simple means is provided for stabilizing the mounting of the blade in such a way as to prevent any wabbling movement thereof.

Having thus fully described my invention, what I claim as new and desire to secure by Letters Patent is:

1. In a knife or cutter of the class described, the combination with a handled bar or shaft, of a knife blade mounted thereon and extended at a right angle therefrom, and a rotary cutter journaled on said blade near one of its ends.

2. In a knife or cutter of the class described, the combination with a handled bar or shaft, of a knife blade adjustably mounted thereon and extended at a right angle therefrom, said blade also extended at an angle therefrom with respect to said handle, and a rotary cutter journaled on said blade near one of its ends.

3. In a knife or cutter of the class described, the combination with a horizontally disposed shaft, of a handle mounted thereon for longitudinal and vertical adjustment with respect to said shaft, a knife blade mounted on said shaft and extended therefrom at a right angle, and a rotary cutter journaled on said blade near one of its ends.

4. In a knife or cutter of the class described, the combination with a horizontally disposed shaft, of a handle mounted thereon for longitudinal and rotatably vertical adjustment with respect thereto, a knife blade mounted on said shaft on each side of said handle and each extended in the same direction from said shaft in parallelism with one another, and a rotary cutter journaled on each of said blades near one of its ends.

HANS C. THOMSEN.